UNITED STATES PATENT OFFICE.

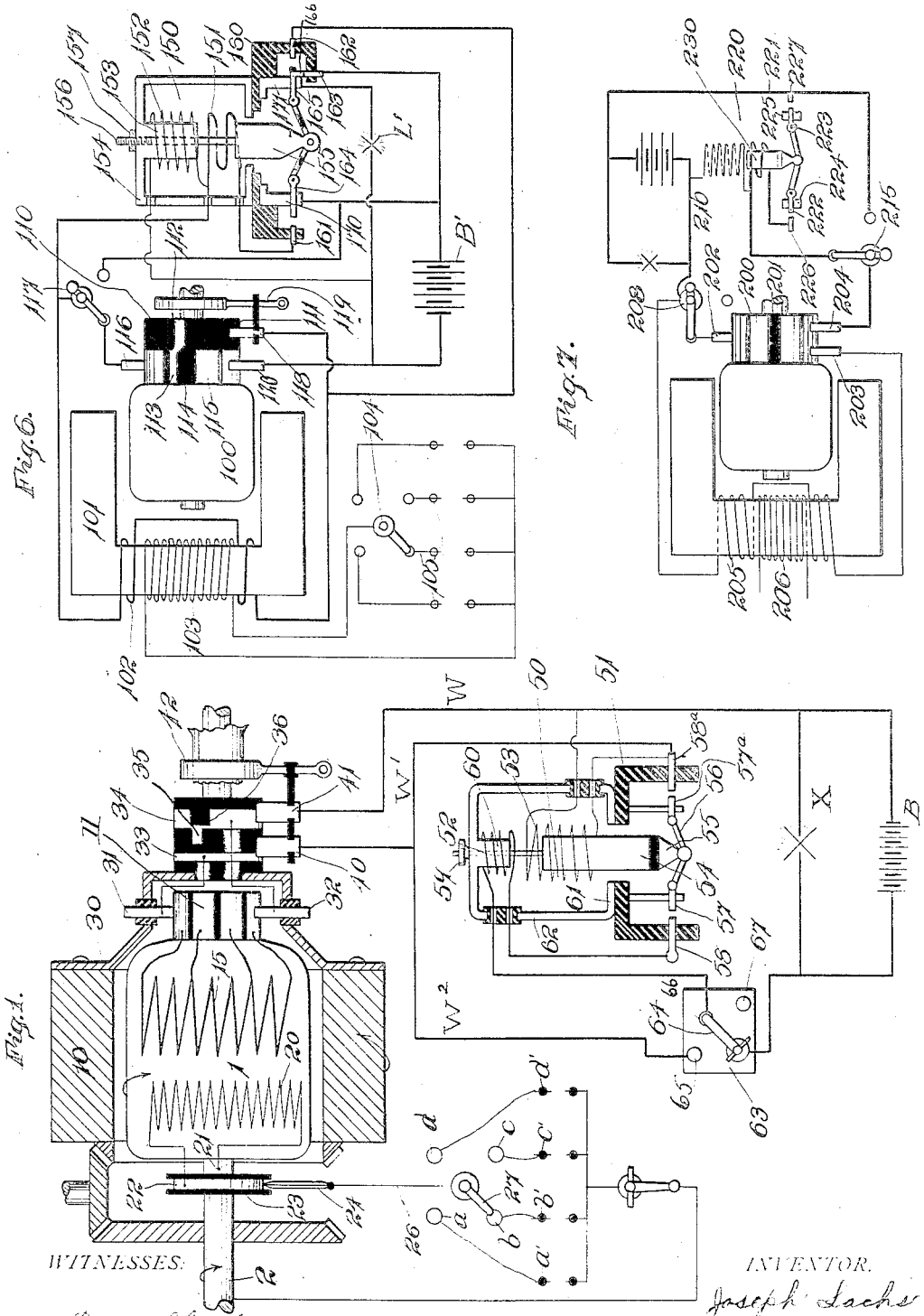

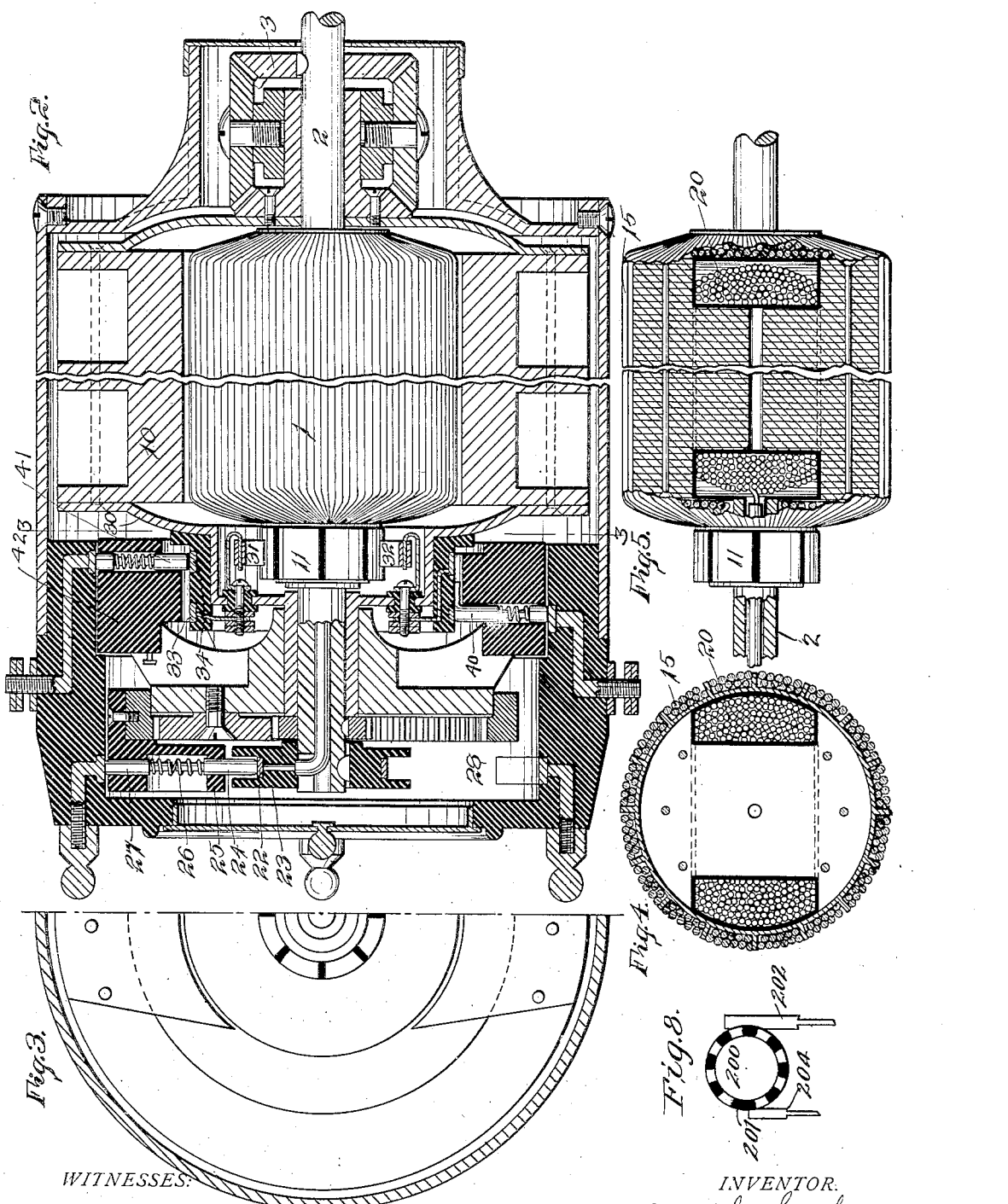

JOSEPH SACHS, OF HARTFORD, CONNECTICUT, ASSIGNOR, BY MESNE ASSIGNMENTS, TO THE HART & HEGEMAN MANUFACTURING COMPANY, OF HARTFORD, CONNECTICUT, A CORPORATION OF CONNECTICUT.

DOUBLE-SERVICE ELECTRIC GENERATOR AND SUPPLY SYSTEM.

1,204,825.

Specification of Letters Patent.  Patented Nov. 14, 1916.

Application filed May 23, 1911.  Serial No. 628,988.

*To all whom it may concern:*

Be it known that I, JOSEPH SACHS, a citizen of the United States, and a resident of Hartford, in the county of Hartford and State of Connecticut, have invented a new and useful Improvement in Double-Service Electric Generators and Supply Systems, of which the following is a specification.

By the invention herein illustrated and described I have produced a single machine which will supply a low tension current for use in the operation of translating or current receiving devices such as lights, batteries, etc., a high tension current for various uses as for instance for igniting the explosive charge in the cylinders of hydrocarbon engines such as used on automobiles, and also means for controlling these currents both in respect of the work they have to do and also in their relation to each other.

By my invention I combine both the ignition and lighting service and translating service in a common system receiving its current from a single magnetic generator operating in conjunction with certain regulating and controlling devices either self contained in the generator or included in the circuit connected thereto, so that the periodic high tension ignition service current is produced by direct inductive action from the low tension current which also serves to provide current for the operation of the translating devices such as lights, batteries, etc. Furthermore, the supply of low tension current is so controlled and governed that the periodic production of the high potential in the secondary coil or coils is effected without any resulting inductive or other disturbance in the primary windings being transmitted to the translating devices. The complete system is also automatically controlled and governed so that the electrical energy supplied to the lights and to the current receiving devices is of proper intensity and amount irrespective of speed fluctuations in the engine, and when a battery is used provides for the connection or disconnection of the generator to the battery as may be required.

The current producing generator employed may be of the single induction type in which only one of the inductor elements is moved, while the other remains stationary, but preferably is of the double induction type as illustrated in my application S. N. 618,193, filed March 31, 1911, in which both of the inductor elements are moved, one oppositely to the other. The use of such a double induction generator is of particular advantage due to the increased output obtained for a given weight.

In the drawings—Figure 1 is a diagrammatic representation of the devices and appliances comprising a complete double service system in accordance with my invention, including the double service generator and also the arrangement of the high and low tension circuit wires leading from the generator, the invention being illustrated in its use as if applied for ignition and lighting purposes on an automobile. Fig. 2 is a central vertical section of a generator and its appurtenant parts made in accordance with my invention. Fig. 3 is a sectional end view on the line 3—3 of Fig. 2. Fig. 4 is a transverse sectional view of the armature. Fig. 5 is a side view partly in section of the armature. Fig. 6 is a diagrammatic view of devices and appliances comprising a complete double service system with the high and low tension windings on the field magnet and illustrating particularly a structure where the low tension field exciting windings are series connected to the armature. Fig. 7 is a diagrammatic view of the complete double service system wherein the high and low tension service windings are on the field, the low tension field exciting winding being shunt connected to the armature. Fig. 8 is an end view of the commutator to show the relation of the brushes 204 and 202 with respect to the wide band of insulation 201.

Referring to the drawings, and particularly to Fig. 1, 1 denotes the armature and 10 the field magnet of a double induction generator, the armature having the shaft 2 by means of which it is driven as by the engine of a motor vehicle, there being interposed between the shaft 2 and the field magnet 10 proper gearing connection in order to rotate the field in the opposite direction from the armature.

The field magnet 10 illustrated is of hardened steel permanently magnetized. The armature has the low tension or primary winding 15 connected to the commutator suitably mounted on the armature shaft. In inductive relation thereto is the high tension or secondary winding 20, one terminal of which is connected to the shaft 2 of the armature as indicated at 21, the other terminal being connected to the high tension collector-ring 22 suitably mounted on the flanged sleeve 23 so as to rotate with the armature and its shaft. Contacting with the high tension collector ring 22 is a brush 24 held in a suitable support, and connected to this brush by the conductor 26 is the distributing brush 27 of a high tension distributer which is arranged to serve a four cylinder engine and has four contacts connected to binding posts $a$, $b$, $c$, $d$ from each of which conductors lead to the terminals $a'$, $b'$, $c'$, $d'$ of each of the four spark plugs. As ordinarily arranged the other terminals of the spark plugs are connected to the engine cylinder and the frame of the vehicle on which it is mounted and in that manner the circuit is completed back to the other terminal of the secondary or high tension coil. The shaft of the armature may be connected to the engine in any suitable manner, and in the arrangement of the parts as here shown it should be operated at twice the engine speed, with which arrangement the rotating distributer brush 27 should be operated at one-half the engine speed.

Attached to the field magnet 10 is the support 30 in which the commutator brushes 31, 32 are mounted but insulated therefrom and coöperating with the commutator 11. The support 30 also carries the cylinder of insulating material on which are located the collector rings 33, 34. The collector ring 33 is connected to the brush 31 and the collector ring 34 is connected to the brush 32. On that side of the ring 34 which is adjacent to the ring 33 is a short circuiting projection 35 and in the other edge of the ring 34 opposite this projection is a circuit breaking notch 36; the upper or forward edges of the projection 35 and the notch 36 are in substantial alinement so that the short circuiting between the rings 33, 34 will occur substantially at the same time as the circuit is broken. The lower or rear edge of the projection 35 must be in advance of the lower or rear edge of the notch 36 in order that the short circuit between the rings 33, 34 is opened before the low tension service circuit is remade. The brushes 40, 41 which coöperate with the collector rings 33, 34 are carried on a support 42 which is rotatably mounted in order to change the position of these brushes for obvious reasons and the brush 40 is laterally adjustable in order to prevent short-circuiting of the collector rings under the starting condition of the engine. The brush 41 may remain stationary, the support 42 sliding through it, so it will always remain in proper position relative to the ring 34. The brush 40 is wide enough and so positioned as to extend from the collector ring 33 to the short circuiting projection 35 and so create the short circuit between the two rings 33, 34.

The regulating or controlling apparatus for the low tension circuit is shown generally at 50 and comprises an insulating support 51 on which is mounted a magnet having a series winding 52 and a shunt winding 53 which are at times in compound relation to one another and at other times in differential relation to one another depending upon which way the current is flowing in the series coil. The magnet is provided with a movable core 54 having an insulated head 55 and toggle links 56 which connect with longitudinally movable contacts 57, 57$^a$ which are adapted to coöperate with the stationary contacts 58, 58$^a$. If desired, the core may be provided with an adjusting device indicated at 59 to limit the extent of its downward movement and thereby positioning it with relation to the stationary core 60 which comprises one pole of the magnet, the other pole being the ends 61 of the yoke 62 of the magnet. A three point switch is indicated at 63 having a swinging contact arm 64 and three contact points, 65 the battery starting contact, 66 the generator contact and 67 the off contact.

X indicates the translating device and B the storage battery.

From the brush 41 extends the common conductor W forming one side of the circuit. The other side of the circuit W' from the brush 40 extends through the controlling switch to the series coil and to the generator contact on the switch 63 from which it is carried by the movable contact lever 64 to the translating devices and battery. It will be seen that the shunt coil, the translating devices and the battery are all connected in shunt across the two sides of the circuit. A conductor W$^2$ also extends from the brush 40 to the battery contact 65 of the switch 63.

The operation of the machine and its connected apparatus is as follows: In order to start the engine readily from the batteries, the contact arm 64 is swung over onto the battery contact 65 and the brush 40 is moved laterally so that it will not short circuit the collector rings 33, 34. The battery now supplies the current to the low tension or primary coil of the armature which circuit is broken by the brush 41 at the notch 36 of the ring 34, inducing current in the high tension or secondary coil which is transmitted to the spark plugs through the medium of the high tension distributer. After the engine is started, the contact arm 64 is restored to the position on the generator contact 66 and the brushes readjusted to their normal position which is indicated in the drawings. With these conditions established, it will be seen that when the primary winding of the armature is short circuited by the brush 40, the low tension service circuit is broken by the brush 41, and that the short circuit of the primary winding is broken before the low tension service circuit is remade; as a result a high potential current is induced in the secondary winding which through the distributer is successively conveyed to each of the spark plugs but this inductive disturbance is not manifested in the low tension service circuit. It is, of course, apparent that while the low tension service circuit is cut off from the primary winding of the armature, the battery is supplying the translating devices with current.

To describe the operation of the controller for the low tension service circuit let it be assumed that the movable contact arm 64 is at the position shown in the drawings on the generator contact 66. If the generator is not supplying sufficient voltage to energize the shunt coil 53 of the magnet the parts remain in the position indicated and the batteries feed current to the translating devices. When the voltage increases to the point where the shunt coil is energized sufficiently to attract and raise the movable core 54, the toggle links move the contact slides 57, 57ª into contact with the stationary contacts 58, 58ª closing the circuit through the series coil of the magnet and the circuit is then completed from the generator through the series coil and the switch 63 to the translating devices and the battery. If now the voltage of the generator runs too high, the core is raised still farther up into the magnet and the toggle links withdraw the slides 57, 57ª from the stationary contacts 58, 58ª breaking that side of the circuit and cutting out the generator from the translating devices and the battery, and again the battery supplies the translating devices.

While the engine is running and it is desired for any reason to cut out the generator and operate the low tension translating devices from the battery alone, the switch arm 64 is thrown over to the off button 67 of the switch 63. It will also be understood that a reverse current from the battery into the generator will bring the controller into action since the shunt coil and series coil of the controller 50 are engaged to act in differential relationship under these conditions.

In the apparatus herein above described, the high and low tension windings are on the armature, the field magnet being of the permanent type, and in Figs. 4 and 5 I have shown one arrangement of the high and low tension windings, the armature being of the drum type. Other forms of windings on armatures of other types can, of course, be utilized.

The high tension service may as well be supplied from proper windings on the field magnet which are arranged in proper inductive relation to the field exciting windings whatever their character may be.

In the modified form of the invention in Fig. 6, 100 denotes the armature and 101 the field magnet which should be permanently magnetized. 102 is the field magnet exciting coil or winding which also acts as the primary to the secondary high tension winding 103 which is arranged in inductive relation thereto. The high potential circuit is indicated as extending from this coil to the distributer 104 by means of which it is successively connected to each of the four spark plugs 105. As has been previously stated in connection with the description of Figs. 1 to 5 inclusive, the armature may operate at twice the engine speed, while the distributer brush may be operated at one-half the engine speed. 110 denotes generally the commutator connected with the armature winding. This commutator has an insulating ring 111 broken at one point by an extension 112 from one of the commutator bars 113, the width of which is reduced so as to leave an insulated space 114 of substantial width between it and the adjacent commutator bar 115. One terminal of the series field exciting winding 102 is connected with the commutator brush 116 through the switch 117, the other terminal of this coil being connected to the short circuiting brush 118. Consequently, whenever the bar 113 of the commutator comes in contact with the short circuiting brush 118 the armature winding and the low tension field exciting winding form a closed circuit. An abnormally large current will be caused to flow through the field exciting winding 102 which current when broken by the opening of this circuit when the extension 112 of the commutator bar 113 passes beyond the brush 118, acting as a primary will produce an inductive high potential effect in the secondary winding 103, which through the medium of the distributer 104 is conveyed to the proper spark plugs. The timing of the high potential effect may be varied by shifting the position of the short circuiting brush around the commutator within the proper limits as by the lever 119. Considering now the low tension service part of the system B′ represents the storage battery, L′ the translating devices such as lamps and 150 the electro magnetic low tension service controller. The controller is substantially like that used in connection with the arrangement shown in Fig. 1 having the series winding 151 and the shunt winding 152 which are arranged to form an iron clad solenoid magnet with a stationary core 153 and shell 154 of magnetic material and the movable core 155 held in proper relationship to the stationary core and coils as by means of the rod 156 and nut 157. By the adjustment of this movable core 155, the operation of the controller can be arranged to become effective at different current values. Mounted in the insulated support 160 are the stationary contacts 161, 162, 163. Connected to the core 155 by toggle links are the contact slides 164, 165, sliding in apertures in posts 170, 171, contact slide 165 having a downwardly projecting contact point 166 for coöperation with the stationary contact 163. The core is insulated from each of the movable contacts and the latter are insulated from one another. The brush 120 is connected to one terminal of the battery and to one terminal of the translating device, the other terminal of the battery is connected to the post 170 and the stationary contact 163, the other terminal of the translating device being connected to the post 171. The series coil is connected in the circuit extending from the lever of the switch 117 to the contact 161. The shunt coil is connected in shunt across the armature circuit. The stationary contact 162 is connected to one side of the series winding of the field magnet to which is also connected the short circuiting brush 118.

When the parts are in the position shown, the controller is in what may be termed its low voltage, no voltage or reverse current condition, and consequently, the battery supplies the translating devices and the generator is disconnected from the low tension service circuit. Assuming now that the generator is developing the proper voltage, the shunt coil of the controller receiving the voltage from the low tension service commutator brushes will cause the attraction of the core which will result in closing the circuit between the contacts 161 and 164 breaking the circuit between the contacts 166, 163 and closing it between the contacts 165, 162. In this position the storage battery is connected across the low tension service brushes of the armature commutator, while the translating devices are connected across the armature and the series field exciting winding; that is, the storage battery is being charged from the armature of the machine direct, while the translating devices are being supplied from the generator acting as a series machine. The translating device L' is only connected in series with the series field coil 102 when the battery is being charged. At other times it is connected directly across the battery. The purpose of this arrangement is to facilitate and simplify the connections and the change of circuits at the controller, and particularly at 162, 163, 165 and 166, so that when the controller acts to shift the battery from charging to discharging, and when the contacts on the commutator act to short circuit the armature windings through the series field, it can be done easily and readily to accomplish the desired result. Increase of voltage generated by the armature will cause a further upward pull on the movable core resulting in the toggle links being drawn upwardly with the core out of their central position bringing about a backward movement of the movable contacts 164, 165 restoring the circuits to the same condition as shown in the drawings, but with the core in its upper rather than in its lower position. It will also be understood that a reverse current from the battery into the generator will bring the controller into action since the shunt coil and series coil are arranged to act in compound relationship under normal conditions but in differential relationship under the conditions just mentioned.

The switch 117 is provided so that the ignition high tension service may be operated by the battery alone for starting or at other times, the current passing from the battery through the switch (then in the opposite position to that shown in Fig. 6) to the primary coil of the field magnet, from thence to the short circuiting brush 118 which acting with the brush 120 makes and breaks the circuit through the medium of the commutator bar 113 and its extension 112 periodically to cause the inductive high tension effect in the secondary winding.

In Fig. 7 the armature windings are connected to the commutator 200 which has two of its segments separated by a wide insulating space 201, this space being of such width that while the longer brush 202 spans it from bar to bar, the shorter brushes 203, 204 do not span it, but for a short interval while the insulating space passes under them these brushes are disconnected from any commutator bar and rest upon the insulation. The shunt field exciting coil 205 is connected by one terminal to the brush 202 through the medium of the switch 208, the other terminal of the coil being connected to the brush 203. Consequently, once during each revolution of the armature the circuit through the shunt field exciting coil is broken and a high potential effect is induced in the secondary windings 206 placed in inductive relation to the primary windings 205 on the field magnet structure. The low tension service circuit extends from the brush 202 to the switch 208 to which the conductor 210 forming one side of the low tension service circuit is connected. The other side of the circuit extends from the brush 204 to the switch 215 and through the series coil and contacts of the electromagnetic controller indicated generally at 220, to the conductor 221 forming the other side of the low tension circuit between which and the conductor 210 the storage battery and the translating devices are connected. The controller has the usual series and shunt coils, the latter being connected across the armature winding and low tension service circuit. Under normal conditions when the current flows from the generator to the battery and translating devices, the two coils of the controller operate to augment one another, but when the current is reversed flowing from the battery to the armature, the series coil is in opposition to the shunt coil. The magnetic effect of the coils is exerted upon the movable core 230 which has attached thereto but insulated therefrom the toggle operated contact slides 222, 223 movable through the posts 224, 225 and adapted to coöperate with the stationary contacts 226, 227.

It will be apparent that in the structures of Figs. 6 and 7 as well as in that of Figs. 1 to 5 inclusive, the parts are so arranged and adjusted that the inductive disturbance in the primary and secondary windings of the generator due to the production of the high potential current for ignition purposes is not manifested in the low tension service circuit due to the fact that in such case this circuit is disconnected from the generator during the high potential induction period.

In the embodiments of my invention herein illustrated and described, the generators are arranged to produce a direct current and storage batteries are utilized. As shown in both Figs. 6 and 7, the generators are of the single induction type, the armature being the rotated element.

It will be clearly apparent to those skilled in the art that the herein described invention is susceptible of various modifications, embodiments or arrangements to suit special or varying conditions, and I wish it to be understood that the terms which I have used are descriptive and not limiting, and that it is my intention to include any and all modifications which come within the scope of the invention as defined in the appended claims.

I claim as my invention:

1. An electromagnetic generator, a plurality of windings therefor, a separate external circuit connected to each of said windings, and means for causing electrical inductive effects to be produced in one of said windings and its connected circuit and preventing said effects from affecting the external circuit of the other winding.

2. A generator, primary and secondary windings thereon, external circuits connected thereto, and means for periodically causing a high potential effect to be produced in said secondary winding and its connected circuit and for preventing said high potential effect from affecting the circuit connected with the primary winding.

3. In a double service system of electrical supply an electromagnetic generator, primary and secondary windings thereon arranged in inductive relation to one another, a high tension circuit connected with said secondary, a low tension circuit connected with said primary, means for periodically establishing operative relations between said windings, and means for disconnecting said low tension circuit from said primary winding.

4. In a double service system of electrical supply an electromagnetic generator, primary and secondary windings therefor, a circuit containing current receiving devices connected to said primary winding, a circuit connected with the secondary winding, means for periodically establishing operative relation between said windings to supply said high tension circuit, and means operating automatically to disconnect said low tension circuit from its primary winding.

5. An electromagnetic generator, a plurality of windings therefor in inductive relation to one another, an independent external circuit for each of said windings, and means for causing electrical inductive effects to be produced in one of said windings without disturbing the external circuit of the other.

6. A double service system of electrical supply comprising an electromagnetic generator, low tension windings on said generator connector to a low tension circuit containing current receiving devices, high tension windings on said generator in inductive relation to said low tension windings, and means for causing the low tension windings to periodically produce a high potential effect in the high tension windings.

7. In a double service system of current supply an electromagnetic generator, a plurality of windings therefor, a separate external circuit connected to each of said windings one of which is adapted for low tension service and includes current receiving devices, the other of which is adapted for high tension service, means for periodically causing an inductive relation between said windings to produce an electrical effect in said high tension circuit and for disconnecting said low tension circuit from its windings.

8. A double service system of electrical supply comprising an electromagnetic generator, low tension windings on said generator connected to a low tension circuit containing receiving devices, a controller for said low tension circuit, high tension windings on said generator in inductive relation to said low tension windings, a high tension circuit connected therewith and containing spark gaps, a distributer for successively connecting the spark gaps to the high tension windings, means for causing the low tension windings to periodically produce a high potential effect in the high tension windings and means for preventing any manifestation of said effect in the low tension circuit and its receiving devices.

9. A double service system of electrical supply comprising high and low tension circuits, parts of which are in inductive relation to one another, a plurality of sources of current supply, means for periodically establishing operative relations between said circuits to produce a high potential effect in said high tension circuit, and a controller connected with and adapted to be operated by either of said sources of current supply to regulate the connection and disconnection of the circuits and generator.

10. A double service system of electrical supply comprising an electromagnetic generator, high and low tension windings thereon in inductive relation to one another, a circuit connected with the high tension winding, a circuit connected with the low tension winding and containing a battery and translating devices, a controller also connected into said circuit and adapted to be actuated by current from said generator and battery either separately or together for regulating the connection and disconnection of the circuits and generator to maintain the electrical effect supplied to the translating devices substantially uniform.

11. A double service system of electrical supply comprising an electromagnetic generator, high and low tension windings therefor, a circuit connected to the high tension winding, a circuit containing current receiving devices connected to the low tension winding, and a controller in said circuit said controller comprising stationary contacts, series and shunt coils and a movable member acted upon by said coils and mechanically connected to said movable contacts to regulate the connection and disconnection of the circuits and generator.

12. In a double service system of electrical supply comprising an electromagnetic generator, primary and secondary windings thereon in inductive relation to one another, a high tension circuit connected with said secondary windings containing spark gaps, a low tension circuit connected to said primary windings and containing a battery and translating devices, means for periodically producing a high potential effect in said secondary winding and its connected circuit and for preventing said high potential effect from affecting the circuit connected with the primary winding, and a controller connected with said generator and said battery and operable by said generator and battery acting separately or together for regulating the connection and disconnection of the circuits and generator to maintain the electrical effect substantially uniform.

13. A double service system of electrical supply comprising an electromagnetic generator, primary and secondary windings thereon in inductive relation to one another, a high tension circuit connected with said secondary windings and containing spark gaps, a low tension circuit connected to said primary windings and containing a battery and translating devices, means for periodically producing a high potential effect in said secondary winding and its connected circuit and for preventing said high potential effect from affecting the circuit connected with the primary winding, and a controller electrically connected with said generator and battery and adapted to regulate the circuit into which said translating devices are connected, said controller comprising stationary contacts, movable contacts coöperating therewith, series and shunt coils and a movable member operated by said coils mechanically connected with said movable contacts to regulate the connection and disconnection of the circuits and generator.

14. In a double service system of electrical supply an electromagnetic generator, primary and secondary windings therefor arranged in inductive relation to one another, separate external circuits connected to each of said windings and means for causing electrical inductive effects to be produced in one of said windings and its connected circuit and preventing said effects from affecting the external circuit of the other winding.

15. An electromagnetic generator, a plurality of windings thereon in inductive relation to one another, separate external circuits connected to each of said windings, translating devices connected into one of said circuits, and means for causing electrical inductive effects to be produced in the winding to which the other circuit is connected.

16. A double service system of electrical supply comprising an electromagnetic generator, low tension windings on said generator connected to a low tension circuit containing receiving devices, a controller for said low tension circuit, high tension windings on said generator in inductive relation to said low tension windings, a high tension circuit connected therewith and containing spark gaps, a distributer for successively connecting the spark gaps to the high tension windings, means for causing the low tension windings to periodically produce a high potential effect in the high tension windings, means for preventing any manifestation of said effect in the low tension circuit and its receiving devices, and automatically operating means for controlling the current in said low tension circuit for regulating the connection and disconnection of the circuits and generator to maintain the electrical effects substantially uniform.

17. A double service system of electrical supply comprising high and low tension circuits part of which are in inductive relation to one another, means for periodically establishing operative relations between said circuits to produce a high potential effect in said high tension circuit, and automatically operating means for controlling the current in said low tension circuit for regulating the connection and disconnection of the circuits and generator to maintain the electrical effects substantially uniform.

18. A double service generator, a plurality of windings thereon, external circuits connected thereto, and means for periodically controlling the current in one of said windings and its circuit, and inductively affecting the other winding.

19. A generator comprising a field magnet, an armature and high and low tension windings thereon, each of said windings being connected and supplying current to external circuits containing current receiving devices, and means for periodically producing a high tension effect in the high tension winding and preventing any inductive manifestation therefrom in the circuit connected to the low tension winding.

20. In a double service generator two inductor members, a high tension and a low tension winding on one of said members, external circuits connected to each of said windings, means for causing periodic high tension effects to be produced in the high tension winding and preventing said effects from affecting the external circuit of the other winding.

21. In a double service generator two inductor members, a plurality of windings on one of said members, separate external circuits therefor, means for causing periodic electrical effects to be produced in one of said windings through the other winding, and means for maintaining the electrical effect in the circuit connected to the other winding substantially uniform.

22. In a double service generator a field magnet, an armature, high and low tension windings on the latter, separate current collecting devices for each of said windings mounted upon and rotatable with the armature shaft, a high tension distributer having a brush adapted to coöperate with the current collecting devices connected with said high tension winding, a rotary support for said distributer brush, external high tension circuits having terminals arranged in operative relation to said distributer, commutator brushes coöperating with said current collecting devices connected with the low tension windings, a collector ring connected with each brush, an external low tension circuit containing a battery and translating devices, a controller in said circuit, means for connecting said collector rings with said circuit, and means for periodically producing a high potential effect in said high tension windings and its connected circuit and for preventing said high potential effect from affecting the circuit connected with said low tension winding.

JOSEPH SACHS.

Witnesses:
H. E. HART,
M. E. O'NEILL.